United States Patent [19]

Wilson

[11] Patent Number: 4,933,786
[45] Date of Patent: Jun. 12, 1990

[54] FAULT TOLERANT INDEX PATTERNS AND DECODING MEANS

[75] Inventor: Rosser S. Wilson, Menlo Park, Calif.

[73] Assignee: Maxtor Corporation, San Jose, Calif.

[21] Appl. No.: 247,244

[22] Filed: Sep. 21, 1988

[51] Int. Cl.$^5$ .............................................. G11B 21/10
[52] U.S. Cl. ................................ 360/78.14; 360/77.05; 360/78.08
[58] Field of Search ............... 360/78.14, 78.08, 78.09, 360/77.01, 77.04, 77.05

[56] References Cited

U.S. PATENT DOCUMENTS

| | | | |
|---|---|---|---|
| 4,636,885 | 1/1987 | Yamada et al. | 360/77.08 |
| 4,638,384 | 1/1987 | Stewart et al. | 360/77.05 |
| 4,682,253 | 7/1987 | Leslie | 360/78.14 X |
| 4,797,757 | 1/1989 | Haitani | 360/77.08 |
| 4,811,135 | 3/1989 | Janz | 360/78.14 X |

FOREIGN PATENT DOCUMENTS 60-52973  3/1985  Japan .................................. 360/78.14

Primary Examiner—John H. Wolff
Attorney, Agent, or Firm—Hecker & Harriman

[57] ABSTRACT

A fault tolerant servo index scheme is described. The present invention provides a servo index pattern and detection method which can be utilized to any servo scheme, including, but not limited to, sector servo and dedicated surface servo. The servo pattern of the preferred embodiment of present invention is a twelve bit pattern chosen to limit the side lobes of an autocorrelation plot of the pattern with a template of the pattern. In this manner a greater number of errors can be tolerated while still permitting index identification. Initially, the entire servo pattern on a servo track is detected in sequence at the bit rate. Each twelve bit sequences of bits is compared to a template of the servo pattern and the number of bits whose position and value ("1" or "0") match the template are determined. Whenever a threshold level (less than the total number of bits in the pattern) of "hits" takes place it assumed that the index has been detected. By minimizing the magnitude of the side lobes of the correlation plot, the threshold can be set between somewhere between complete correlation and the side lobe number. The lower the side lobe, the greater the number of errors which can be tolerated while still indicating an index identification. In one embodiment of the present invention, twelve bit sequence of the servo pattern are compared to a sequential series of templates in which a three bit burst error is implemented. Therefore, even if three consecutive index pattern bits are damaged the index can still be detected.

29 Claims, 7 Drawing Sheets

FAULT TOLERANT INDEX PATTERNS AND DECODING MEANS

BACKGROUND OF THE PRESENT INVENTION

1. Field of the Present Invention

This invention relates to the field of magnetic media storage systems.

2. Background Art

Mass storage for computer or other information systems is typically provided by magnetic media storage systems such as rigid or flexible disk storage systems. A rotating disk having a magnetic media layer on the surface is accessed by a "read/write" head which is used to store and retrieve information from the disk surface. To store information on a magnetic media disk, flux reversals are induced in the magnetic particles comprising the surface. When a magnetic read/write head is passed over the flux reversals, a signal is induced in the head which can be decoded to provide information.

Typically, data is stored on a magnetic disk in a series of concentric "tracks" on the surface of the disk. The read/write head moves back and forth radially on the disk so that it can be selectively positioned over one of the tracks. Once in position over a track, the head remains in place as the track rotates beneath it allowing the head to read or write data on the track.

To effectively read and write data, it is necessary that the position of the tracks with respect to the head be known. In addition to knowing which track a head is over, it is necessary to know where on that particular track the head is positioned.

In the prior art, position information is provided through the use of servo patterns. A servo pattern is a permanent pattern on a storage disk which can be used to provide position information. The servo pattern is detected by the head and, by properly decoding the servo pattern, signifies track position.

Generally, two types or servo schemes are implemented in the prior art, sector servo and dedicated surface servo.

In the dedicated surface servo scheme, one side of a data disk contains only servo information. A servo head is positioned over the surface. One or more other read/write heads are positioned over other disk surfaces used for data storage and retrieval. These read/write heads are in a fixed position relative to the servo head and are coupled mechanically thereto. Therefore, if the radial position of the servo head is known, the position of the read/write heads is known as well. The servo pattern is typically a series of concentric tracks corresponding to the number of data tracks on a disk. Each track is encoded with a sequence of magnetic transitions disposed in a plurality of servo frames. Each frame typically contains a sequence of magnetic transmissions which encode both an analog measure of servo head radial position, as well as single bit of digital information used to encode index information.

In addition to knowing the track over which a read/write head is positioned, it is necessary to know at what circumferential position in the track the head is located. Generally, an "index" is defined at a specific circumferential location in the servo pattern to indicate the start/end location of each data track.

The index on each track consists of a unique sequence of servo frames which jointly encode a specific binary sequence of bits which is defined as the index position.

In the prior art, a five to eight bit sequence is generally utilized to define the index. Decode circuitry coupled to the servo continually searches for the specific index bit sequence to determine index position. When the complete index sequence is detected, a track index point signal is emitted by the index detection circuits for use in other elements of the system of which the disk drive is a part.

If for some reason index is lost, the decode circuitry reads the entire servo track until the index sequence is found again. A disadvantage of this prior system is that it is not fault tolerant. If a servo frame in the index area is damaged or servo information is lost, the bit sequence will never be detected and an index will not be established. In other instances, if the servo information itself is damaged, a false index may be indicated. A loss of index can result in a data track being unavailable for use, loss of data, or data errors.

In the sector servo method, bursts of servo information are disposed on a disk surface in between data areas. The same head is used to reproduce both data and servo information. As in the dedicated servo approach, each servo burst contains both analog track position information, and digital information. The digital portion of the servo burst can include both a track address field, and a single index bit.

Betts et al in U.S. Pat. No. 4,511,938 shows a typical implementation of sector servo and provides for a single bit in the servo burst to encode index point. He does not disclose means for decoding this bit in context in a fault-tolerant manner to provide a reliable index indication despite possible flaws in one disk surface which could render one or more servo bursts unreadable.

Use in the prior art of binary sequences having a high degree of selfcorrelation is known, however these codes have been applied primarily either in detection schemes in radar or in data transmission and not in the servo systems of disk files. Barker, "Group Synchronizing of Digital Systems" Signals Research and Development Establishment; reprinted in "Communication Theory", W. Jackson New York Acadamic Press, cites a simple algorithm for determining highly selfcorrelated sequences by juxtiposition of simpler sequences. The Barker article does not treat more general sequences which are used in the present invention, and which are obtainable by computer search techniques nor does it propose elaboration of the code sequence to minimize misdetection in the presence of other admissible data sequences.

Therefore, it is an object of the present invention to provide a servo index pattern detection scheme which is fault tolerant.

It is yet another object to provide a servo pattern detection scheme which is fault tolerant for error bursts in which three or fewer consecutive dedicated servo frames or sector servo bursts are damaged.

It is still another object of the present invention to provide a servo index detection scheme which additionally provides means for performing physical track addressing of individual tracks on the servo surface.

SUMMARY OF THE INVENTION

A fault tolerant servo index scheme is described. The present invention provides a servo index pattern and detection method which can be utilized in any servo scheme, including, but not limited to, and dedicated surface servo and sector servo.

The servo pattern of the preferred embodiment in a dedicated servo environment of the present invention includes two occurrences of a twelve bit pattern specially chosen to limit the amplitude of the side lobes of an autocorrelation plot of the pattern with a template of the pattern. In this manner a greater number of errors can be tolerated while still permitting index identification. Initially, the entire servo pattern on a servo track is detected in sequence at the servo frame bit rate. Each twelve bit sequence of bits is compared continually to a fixed image, or template of the servo pattern, and the number of bits whose position and value ("1" or "0") match the template are determined. Whenever a threshold level (less than the total number of bits in the pattern) of agreements takes place it is assumed that the index has been detected. By suitably choosing the index code sequence to minimize the magnitude of the side lobes of the correlation plot, the threshold can be set intermediate between a number corresponding to complete correlation and a number corresponding to the maximum side lobe value. The lower the side lobe, the greater the number of errors which can be tolerated while still indicating an index identification. In one embodiment of the present invention, twelve bit sequences of the servo pattern are compared to a sequential series of templates in which all possible don't care states corresponding to the occurrence anywhere in the sequence of a three bit burst error is implemented. Therefore, even if three or fewer consecutive index pattern bits are corrupted, the index can still be detected.

The first preferred embodiment of the present invention is used as part of a disk drive positioning apparatus employing a dedicated servo surface. A first bit sequence having a first number of bits is formed by suitable encodement of digital portions of the prerecorded servo data at the index point, while a second bit sequence comprising a second number of bits is formed adjacent the first bit sequence. A third bit sequence is formed such that the second bit sequence is disposed circumferentially between the first and third bit sequences. The third bit sequence has the same pattern as the first bit sequence. Identical gray code binary true address absolute position sectors (APS) values are disposed at fixed intervals around the servo track. The first encoding of the APS values occurs immediately adjacent the third bit sequence.

Detection means such as a read/write head disposed adjacent the surface, and associated signal processing means, provides a serial bit stream corresponding to the digital information encoded into the servo frame sequence, and an associated clock at the servo frame rate. A shift register means is coupled to the detection means for sequentially receiving the serial output and clock, and provides a parallel output. A plurality of comparators is coupled to the shift register output for comparing it to the template.

A first counter and logic circuits coupled to the comparator outputs determines the occurrence of first and third bit sequences displaced one from the other by the length of the second bit sequence. A second counter is coupled to the output of the first counter and logic circuits, and reset by an output of the first counter. The second counter governs deserialization of the APS track address values.

A second embodiment of the present invention may be practiced as part of a disk drive employing a sector servo technique. The preferred embodiment comprises a sequence of sector servo bursts, each burst containing a single index bit, which encodes a binary zero or one.

The index bit is used in twelve adjacent sector servo bursts to encode an index bit pattern. The index bit in all remaining sector servo bursts is fixed to zero. Detection means present the index bit to a servo control microprocessor means at each sector time. Microcode implements a software shift register, and continually compares the shift register contents with a template image of the index pattern and, when the number of agreeing bits exceeds a fixed threshold level, microcode alerts a hardware index circuit. The hardware index circuit provides an index pulse accurately synchronized with the time of occurrence of the next arriving servo sector.

DETAILED DESCRIPTION OF THE PRESENT INVENTION

Figure 1:
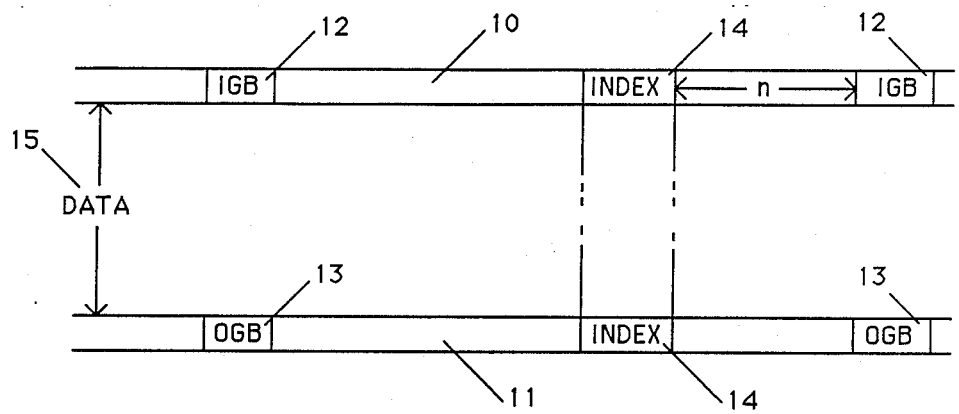
FIG. 1 is a section of a dedicated servo track illustrating a prior art index pattern.

A fault tolerant servo index scheme is described. In the following description, numerous specific details, such as number of bits, frequency, etc., are set forth in order to provide a more thorough understanding of the present invention. It will be apparent, however, to one skilled in the art, that the present invention may be practiced without these specific details. In other instances, well known features have not been described in detail in order not to obscure the present invention. The invention will be described in its applicability to both dedicated and sector servo disk files.

DEDICATED SERVO

In the present invention as practiced in a dedicated servo environment, a three stage index pattern is utilized for index detection. The pattern consists of a first highly self-correlated sequence, a second constant value sequence and a third sequence identical to the first. As the servo pattern is encountered, a comparison of the bit sequences is made to a template of the self-correlated sequence. This comparison is used to generate a plot of matching bits versus shifts relative to the template. The plot includes a peak value where the encountered sequence matches the template as well as one or more side lobes where less than all bits are matched.

The self-correlated sequence is selected to minimize the magnitude of the side lobes. As a result, a threshold level of index detection can be established between the magnitude the largest side lobe and the detection peak value. Therefore, a certain amount of error can be introduced into the sequence or to bits adjoining the sequence without affecting the ability to detect the index.

After the three stage index pattern is initially detected, a counter is enabled so that a detection window is only opened when the last stage of the three-stage pattern is expected to be encountered on subsequent revolutions of the disk. Detection on subsequent revolutions of the last stage of the pattern coincident with the detection window provides an index function which updates index position.

The preferred embodiment of the present invention is used as part of a disk drive positioning apparatus including a rotating magnetic media storage disk. An index pattern consisting of the first and second self-correlated sequences described above separated by the constant value bit sequence is formed on the disk. Additionally, interspersed on the disk at fixed circumferential intervals are 16-bit gray-code representations of radial track absolute address. Use of the three-stage index pattern is required in order to ensure that the track absolute address data are not falsely detected as index.

In a first embodiment, a read/write head is disposed adjacent the disk for detecting the index pattern and providing a serial output. A demodulator processes the output to the head to yield a serial binary data sequence and associated clock. A shift register means is coupled to the demodulator means for sequentially receiving the serial output thereof, and provides a parallel output of the last 12 bits encountered up to that point in time. A plurality of first comparators is coupled to the shift register output for comparing it to a template of the first barker sequence. These comparators generate a binary number count indicative of the number of bits in agreement between the template and the contents of the shift register.

This count is provided to a second comparator. The second comparator is also coupled to a reference value, and provides output when the count is greater than or equal to the reference value. The output of the second comparator is provided to a detection circuit which detects the three stage index pattern as two instances of the self-correlated sequence displaced by the length of the constant value sequence. The detection circuit controls a fixed counter which governs deserialization of the absolute position data.

In an alternate embodiment, apparatus for detecting the index in spite of burst errors is utilized. The first alternate embodiment differs solely in the means of detection of the three-stage index code. A shift register receives from the disk surface and provides a parallel output to a number of comparators. Each comparator is coupled to a template representing the self-correlated sequence with one of the possible burst error sequences contained therein. These comparators are coupled to an OR gate so that if the shift register output matches at least one of the burst error templates, an index detect signal is generated. The output of the OR gate is supplied to detection and counter circuits identical to those of the first embodiment.

A section of servo track illustrating a prior art index pattern is shown in FIG. 1. In disk storage systems, the minimum and maximum radius of area available for storage is defined by the servo disk through use of an inner guard band 10 (IGB) and outer guard band 11 (OGB). Generally, the area 15 between the IGB and OGB 11 is area suitable for data storage.

Each servo track on a disk, such as IGB 10 of FIG. 1, is defined by the rotation rate of the disk, and by the writing frequency, into a successive series of "frames". Each frame contains both analog information, and a single bit of digital data. Demodulator circuits known in the art can be employed to detect analog head-displacement information and to extract the digital information and produce a single bit corresponding to the digital data, as well as an accompanying frame-rate digital signal. For the ensuing discussion, bit and frame are used interchangeably.

As noted previously, a series of bits referred to as the index bits, define the start-stop point or index of each track. The index 14 extends radially from the inner guard band 10 to the outer guard band 11. At each servo track, the same sequence of bits is repeated to indicate the index position. In the example illustrated in FIG. 1, the index pattern is 10101. Spaced periodically from the index 14 are a number of guard band markers such as inner guard band markers 12 on inner guard band 10 and outer guard band markers 13 on outer guard band 11. By referencing to the inner guard band or outer guard band, the radial head position relative to the guard bands can be determined. These guard band markers are typically spaced a number of frames or bits from each other and from the index bit sequence and, like index, are encoded as a specific pattern.

Figure 2:
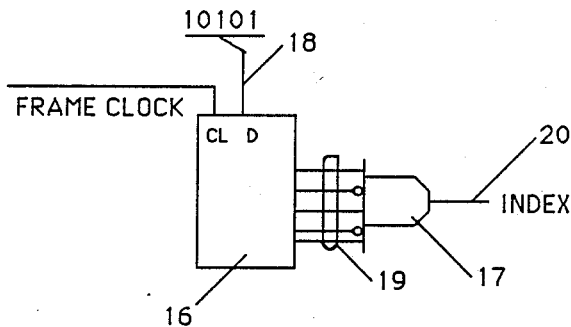
FIG. 2a illustrates a single bit frame of the prior art and in the present invention.
FIG. 2b is a block diagram illustrating a prior art index detection scheme for dedicated servo.
Figure 2A:
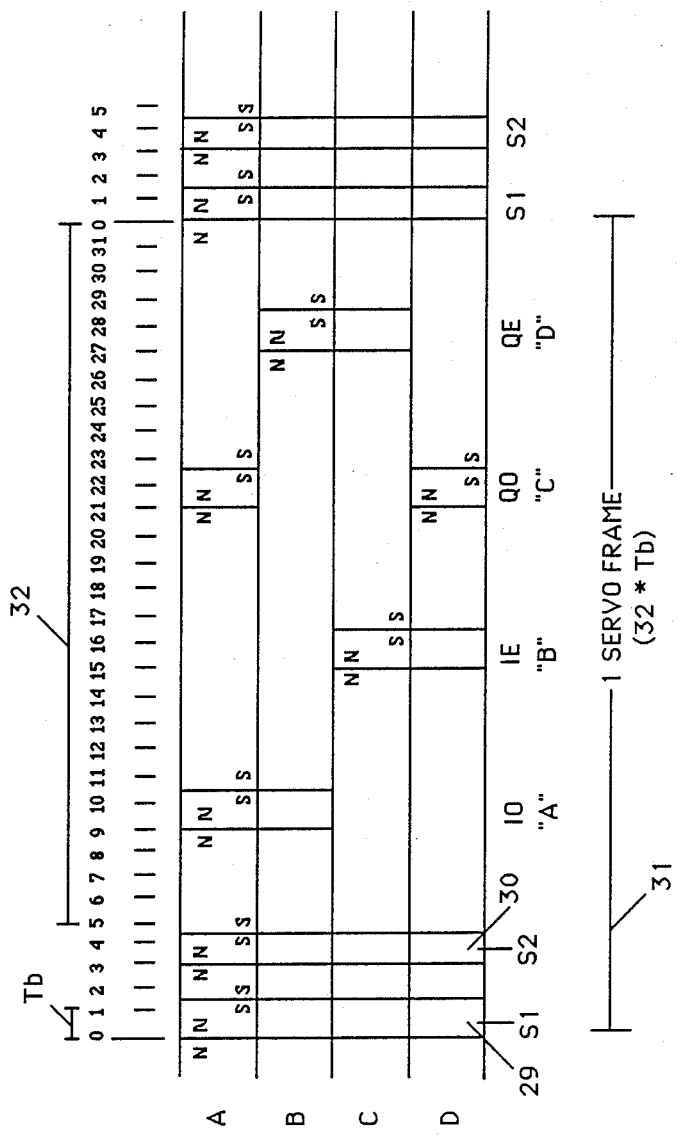

A suitable encodement of a servo frame in the prior art and in the present invention is shown in FIG. 2a. A servo frame contains both digital and analog information that is characterized as a logic "one" frame or a logic "zero" frame. Each servo frame is $32 \times T_b$ in length and begins with two sync bits, S1 and S2, 29 and 30 respectively. The sync bits 29 and 30 are followed by the data portion of the frame 32 which includes analog information. In the present invention, a frame is a logic zero is the sync bits are both present. The frame is a logical "one" if sync bit S1 is omitted and sync bit S2 is present. It will be appreciated that alternative methods of encoding servo frames are known in the art, and can be practiced with the present invention.

One disadvantage of such a prior art servo scheme is when damage occurs to the index sequence. In such a case, the index for a particular track or tracks cannot be identified, rendering the track unusable and causing the loss of data associated with that track. A second disadvantage is the inability to provide absolute position information for each servo track. Whenever radial position is lost, the servo head must be swung back to the nearest inner or outer guard band for recalibration and referencing.

Referring to FIG. 2b, a typical prior art circuit for decoding the index pattern of FIG. 1 is illustrated. The servo index bits are sequentially coupled to shift register 16 on input line 18. Shift register 16 is a serial input parallel output shift register, with a five bit output 19. The output 19 is coupled to AND gate 17 with the second and fourth inputs inverted. In this manner, when the desired servo index pattern, 10101, is detected, a high signal will be generated on output 20 of AND gate 17. However, if one of the servo index bits is damaged, AND gate 17 will never output a high signal since that particular bit combination will not be detected. For example, if the second bit of the bit index sequence is damaged and reads as a "1" the logic of AND gate 17 will not be satisfied. Thus, the servo index scheme of the prior art is not fault tolerant. In other words, a single fault renders the system inoperable.

Figure 3:
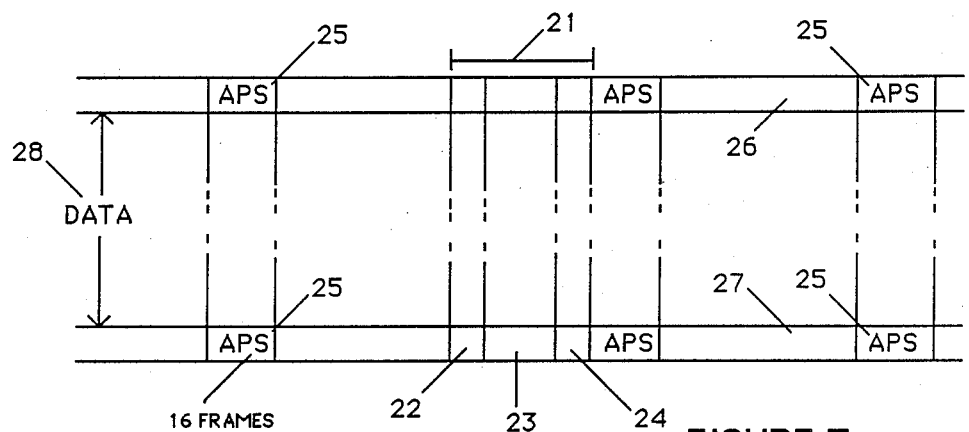
FIG. 3 is a section of a dedicated servo track illustrating the index scheme of the present invention.

The servo index pattern of the present invention is illustrated in FIG. 3. The servo index pattern comprises an index "zone" 21 comprised of first self-correlated sequence 22, constant value sequence 23, and second self-correlated sequence 24. In the preferred embodiment, the first and second self-correlated sequences 22 an 24 are identical bit patterns. The constant value sequence may be all "zeros" or all "ones".

By employing the three stage index zone of the present invention, a "worst case" bit loss environment can be defined. Any suitable highly self-correlated pattern can be developed to compensate for the worst case situation. In addition, a three stage index zone substantially precludes false index indications from other areas of the track. The Hex 'F59' self-correlated pattern employed in this invention was obtained from a search of the field of all 12-bit binary numbers. This pattern is the only pattern that is tolerant of three or fewer single-bit errors, or single three-bit burst errors.

In addition to the servo index zone 21, the servo pattern of the present invention employs absolute position sectors (APS) 25. These APS zones 25 are located on both the inner and outer guard tracks (26 and 27, respectively), as well as all intermediate tracks in the data zone 28. The APS zones provide absolute position information in a radial direction for each servo track. The APS zone on each track contains a different bit pattern than in adjacent tracks. In this manner, it is not necessary to recalibrate to a guard track whenever radial position is lost. Instead, radial position can be regained by detecting and decoding the APS zone on a particular track being accessed. Note if the invention is practiced using a quadrative encoding of the servo information which necessitates use of a servo head which spans two tracks than each pair of tracks contains a different bit pattern than in adjacent pairs of tracks.

In the preferred embodiment of the present invention, each stage of the index zone is 12 bits in length. However, any suitable length may be utilized without departing from the scope of the present invention. It is desired to define a self-correlated sequence which permits index detection up to a maximum number of errors in either the sequence itself or the constant value bits prior to the index sequence.

The instant at which the self-correlated sequence is correlated with a template of itself is shift position zero. At shift position zero, the correlation (number of matching bits between sequence and template) is at its peak value PK, where PK equals the number of bits in the self-correlated sequence. Thus, for a 12 bit sequence, PK equals 12 in the error free case.

In the present invention, it is desired to a provide a highly self-correlated sequence which allows unambiguous detection in the presence of NE or fewer errors. Let N denote the number of shifts of data in the shift register relative to the point (N=0) where the data are contained completely within the shift registers and are aligned with the template. Then, a detection threshold DT can be established where, for N less than or equal to −1, SL (maximum side-lobe value) plus NE is less than DT (detection threshold). For N=0, PK−NE≧DT (Equation 1).

In the preferred embodiment of the present invention, it is desired that detection be unambiguous for up to three errors. Therefore, the detection threshold is equal to 9(PK(12)−NE(3)=9) (Equation 2). Therefore, any time at least nine bits in sequence are in agreement with the template, the index is detected.

For shifts in the negative direction, in the direction of the constant value sequence, SL plus NE must be less than DT. Therefore, SL plus NE must be less than 8. Therefore, the maximum value of SL is 5. In other words, the maximum value of a side lobe of the correlation plot is 5.

Figure 4:
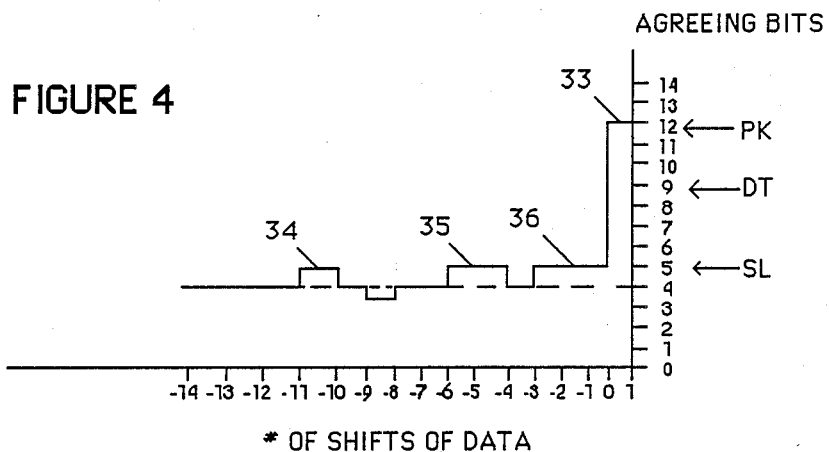
FIG. 4 is a correlation plot of the number of agreeing bits versus number of shifts of data with respect to a pattern template.

Setting the constant value bits equal to zero, and then substituting all possible 12 bit combinations of the self-correlated sequence and plotting the correlation, it is determined that only a single 12 bit highly self-correlated sequence satisfies the condition set forth above, namely, bit sequence Hex 'F59' (111101011001). A correlation plot of this sequence as a template with respect to the constant value sequence and the sequence itself is illustrated in FIG. 4. The peak value 33 is equal to the number of bits in the sequence, namely 12. The maximum side lobe value is 5, so that equations 1 and 2 above are both satisfied. Review of the correlation plot shows that at shift position zero, even if three errors existed in the index sequence, the threshold value (9) of bit agreement is achieved. At negative shift positions, even if three errors were introduced in the constant value sequence, the bit detection level (8) is still less than the detection threshold level so that false index indications will not occur.

Figure 5:
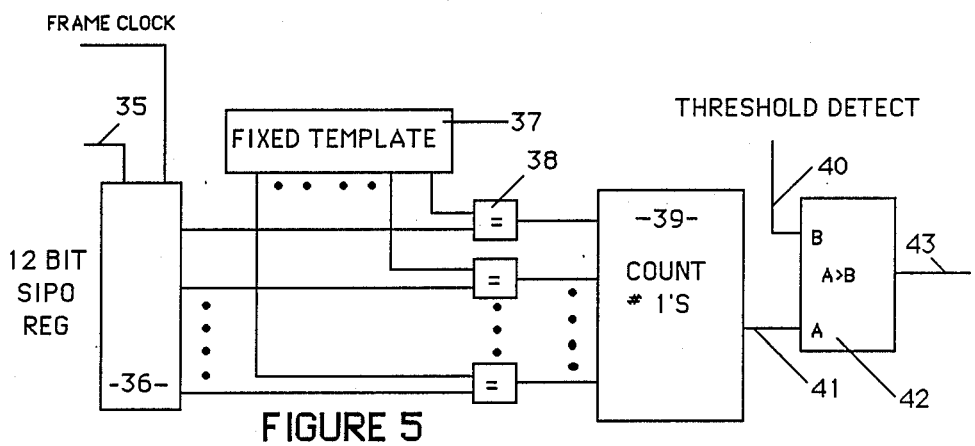
FIG. 5 is a block diagram of the detection circuitry of the present invention.

A block diagram illustrating the detection circuitry of the present invention is illustrated in FIG. 5. The detection circuitry of the present invention consists of an input means for receiving the data stream bit sequence; comparing means for comparing the template with the data stream; counting means for indicating the number of bits in agreement between the template and bit sequence; and a second comparison means for indicating when the detected number of bits in agreement exceeds the threshold level.

The input means comprises a serial to parallel shift register 36. The data stream is coupled to input 35 of the shift register 36. In the preferred embodiment of the present invention, the shift register 36 is a 12 bit shift register. Shift register 36 has a 12 bit parallel output with each bit coupled to one input of comparators 38.

The fixed template is stored in template storage 37. Each bit of the fixed template is coupled to the second input of comparators 38. These components can be exclusive NOR gates or, more simply, invert/non invert elements chosen to correspond to the bit sequence of the template In this case, the template is implicit in the choice of the invert or non-invert element. When the inputs of a comparator 38 match, a logical "one" output is provided to ones counter 39. The ones counter may be implemented as a cascade of full-adder elements or as a ROM-based look-up table. Ones counter 39 outputs a four bit digital word 41 which indicates the number of matches of the comparators 38. This output is coupled to an input of comparator 42 along with the threshold level 40. Comparator 42 is a B≧A comparator, so that when the ones count 41 is greater than or equal to the threshold count 40, a high signal 43 is provided. Output 43 of comparator 42 indicates detection of either stage 1 or stage 3 of the index mark. The general detection scheme of FIG. 5 provides detection of either stage in the presence of up to three random or clustered errors in or preceding stage 1 and/or stage 3 of the highly self-correlated sequence used to encode stage 1 and stage 3 of the index mark.

Figure 6:
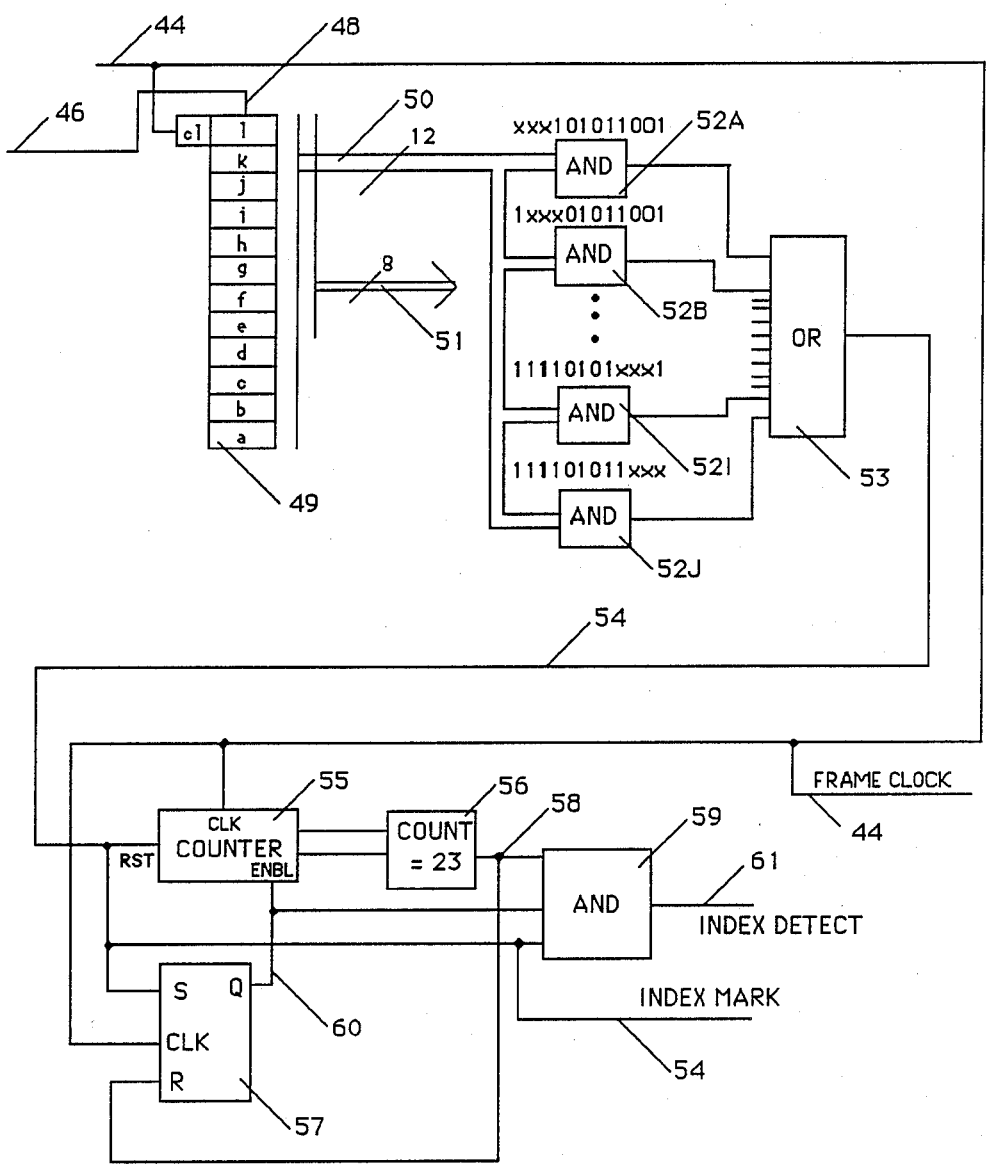
FIG. 6 is a block diagram of a burst error detection circuit.

An alternate embodiment of the detection circuit of the present invention is illustrated in FIG. 6. The circuitry of FIG. 6 simplifies the decoding of stage 1 and stage 3 the index code by narrowing the detectability criteria from detectability in the presence of three random errors to detectability in the presence of a single burst of less than or equal to three bits. This allows substitution of a simple AND/OR logic network for the full adder and comparator circuit of the preferred embodiment. The embodiment of FIG. 6 operates by decoding the index code in the presence of all possible three bit burst errors.

There are 10 possible three bit burst combinations:

TABLE 1

| | |
|---|---|
| a. | XXX101011001 |
| b. | 1XXX01011001 |
| c. | 11XXX1011001 |
| d. | 111XXX011001 |
| e. | 1111XXX11001 |
| f. | 11110XXX1001 |
| g. | 111101XXX001 |
| h. | 1111010XXX01 |
| i. | 11110101XXX1 |
| j. | 111101011XXX |

The bit sequence 46 is coupled to AND gate 45. The output 48 of the AND gate is coupled to shift register 49, which is a serial input parallel output (SIPO) shift register. The shift register 49 is clocked with frame clock signal 44. The shift register 49 outputs a first parallel output 50 representing the index frame bit sequence and a second 8-bit parallel output representing APS data 51. The index sequence 50 is coupled to a plurality of AND gates 52A-52J. The AND gates 52A-52J are each arranged to decode a separate corresponding sequence of Table 1. The outputs of AND gates 54A-52J are coupled to OR gate 53 so that if any one of the AND gates is satisfied, an index marks signal 54 is provided by the OR gate 53.

The index mark signal 54 is provided to counter 55 along with frame clock 44. Signal 54 synchronously resets counter 55 when OR gate 53 detects the highly self-correlated sequence used to encode stages 1 and 3 of the index mark. The index mark signal 54 is also coupled to synchronous set/reset flip-flop 57 which outputs count enable signal 60 to 5-bit (five) counter 55 on the occurrence of the first stage of the index zone. The "set" input of the flip-flop 57 dominates the "reset" input in event of simultaneous "set" and "reset" inputs. The output of counter 55 is coupled to comparator 56. Counter 55 counts 23 frame clocks. At this point, if the second self-correlated sequence (third stage of the index zone) is detected, the output of the AND gate 59 becomes true, which indicates that the index mark has been located. The output 60 of flip-flop 57 is coupled to AND gate 59 along with the output 58 of comparator 56 and index mark 54. Comparator 56 is implemented as a 5-input AND gate, with appropriate inversions of its inputs.

On start-up, the first occurrence of the self-correlated sequence is detected and its occurrence is signaled by the setting of flip flop 57. A window is opened exactly 12 bits later by means of counter 55 and comparator 56, after the constant value sequence, to look for the second instance of the self-correlated sequence. When this is detected, output 60 enables 23 counter 55 to count up by one at each occurrence of a positive edge of frame clock 44. The second occurrence of the sequence, namely the third stage of the index mark, is defined as the index marking point of the disk track.

Figure 7:
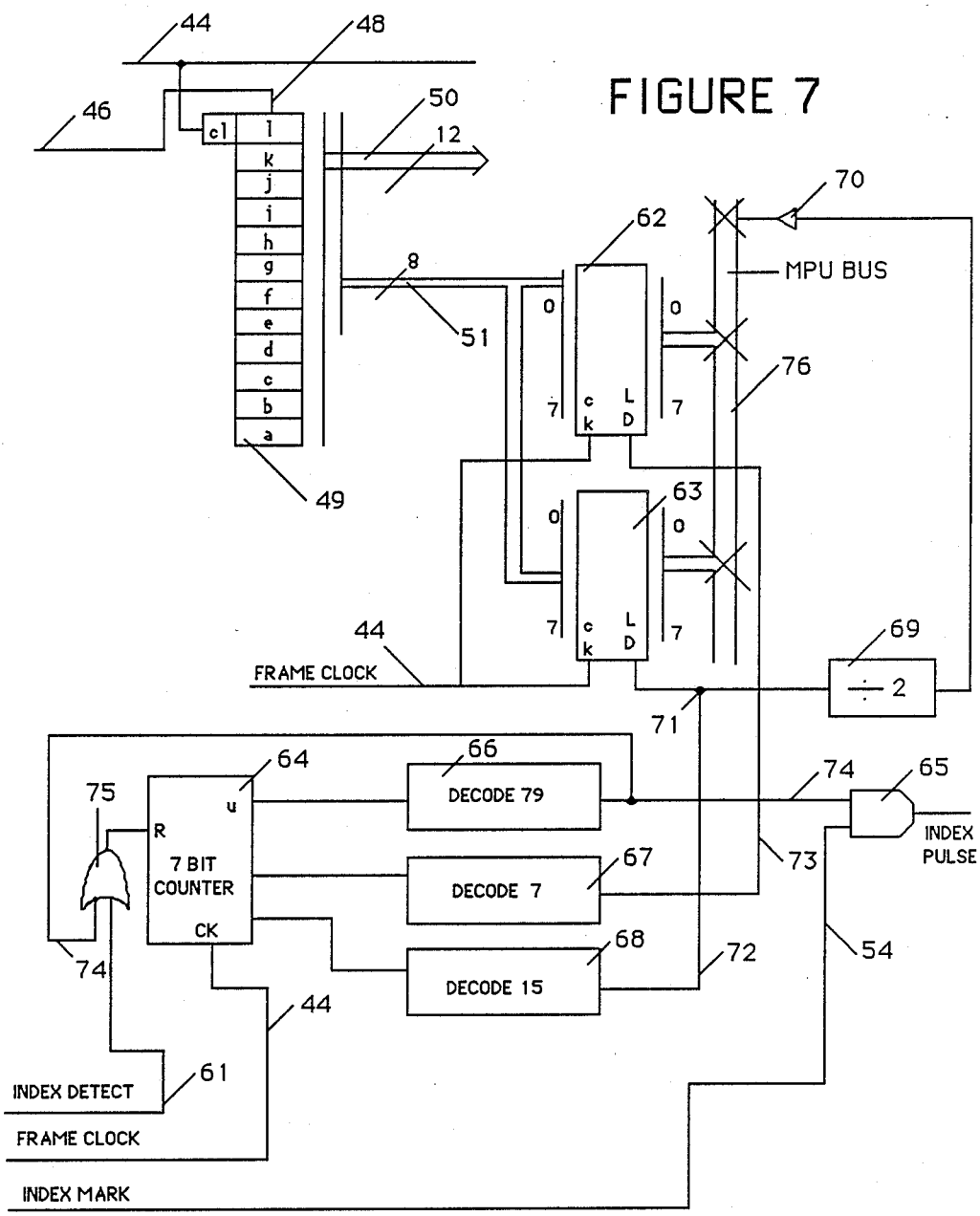
FIG. 7 is a circuit diagram illustrating APS Decoding logic and pulse generators.

FIG. 7 illustrates the logic associated with absolute position (APS) decoding. Shift register 49 receives the bit sequence 46 as described in connection with FIG. 6. The output 50 of the shift register 49 is directed to AND gates for template comparison as shown in FIG. 6. Output 51 of shift register 49 is provided as an input to 8 bit synchronously loadable parallel-registers 62 and 63 on bus 51. The registers 62 and 63 are clocked by frame clock 44. The register and 62 and 63 provide their outputs to MPU bus 76, for inspection by a system control microprocessor.

Index detect signal 61 from FIG. 6 is coupled to OR gate 75, along with a feedback signal 74 from decoder 66. The output of OR gate 75 synchronously resets 7 bit counter 64 to zero. The counter 64 counts at the servo frame rate, being clocked by frame clock signal 44.

States 7 and 15 are decoded from the counter to control loading of the 16-bit APS code into the 8-bit registers 62 and 63 at the APS points of the servo track. Because APS points are spaced 80 frames from each other and from the Stage 3 of the index mark, the counter is set to count modulo 80 by decoding state 79 and using this decode to reset the counter to zero. The output of the counter 64 is coupled to decode 79 element 66. The output 74 of decode 66 is coupled to OR gate 75. When the counter 64 has counted modulo 80, the signal 74 is asserted thus re-setting counter 64. The output 74 of decode 66 is also coupled to AND gate 65 along with index mark signal 54 (from FIG. 6). When the reaches stage 79 and the index mark signal 54 is simultaneously true, AND gate 65 indicates an index pulse output.

The index pulse produced in the system is generated by ANDing together at gate 65 a decode of counter state 79 with line 54 (indicates stage 1 or 3 of index mark). In this way, additional noise and defect immunity is achieved in index pulse generation since the full 3-stage mark need be detected only initially. Thereafter, detection of stage 3 alone suffices. Counter 64 also provides an output to decode 15 block 68, which outputs a high signal 72 when state 15 of the computer is decoded. The signal 72 is coupled at node 71 to divider 69 and register 63. Divider 69 toggles when the APS is valid. The output of divider 69 is coupled to MPU bus 76 through ingate 70.

Decoder 67 is also coupled to output of counter 64. When state 7 of the counter is detected, decoder 67 delivers a signal on line 73 to register 62. The outputs 72 and 73 of decoder 67 and 68 control the loading of registers 62 and 63. Registers 62 and 63 thereby are loaded with most-and least-significant 8-bit bytes of the 16-bit APS information.

SECTOR SERVO

In the Sector Servo environment, position error signal data are written at regular spaced sectors of all data tracks. The areas between the servo sectors are used for data storage and retrieval. A sector servo scheme is a "discrete time" system in which position information is sampled position information. Each servo burst of a sector servo includes both analog track position information and digital information. The digital portion of the servo burst includes a track address field and a single index bit. In the sector servo environment of the present invention, the self correlated bit sequence is encoded in twelve adjacent sector servo bursts, one bit of the pattern in each burst. The index bit in all remaining sector servo bursts on the track is fixed at zero.

In a dedicated servo environment, hardware is used to receive the servo information into a shift register and provide it to decode circuitry. In the sector servo environment, a shift register can be implemented in software (microcode) and the servo index bit stream can be continuously compared with a template image of the desired index pattern. As with the dedicated surface implementation, the index pattern is such that only a threshold level need be detected to provide an index mark signal. When this threshold level is exceeded, the microcode alerts a hardware index circuit to provide a index pulse synchronized with the time of occurrence of the next arriving servo sector.

Figure 8A:
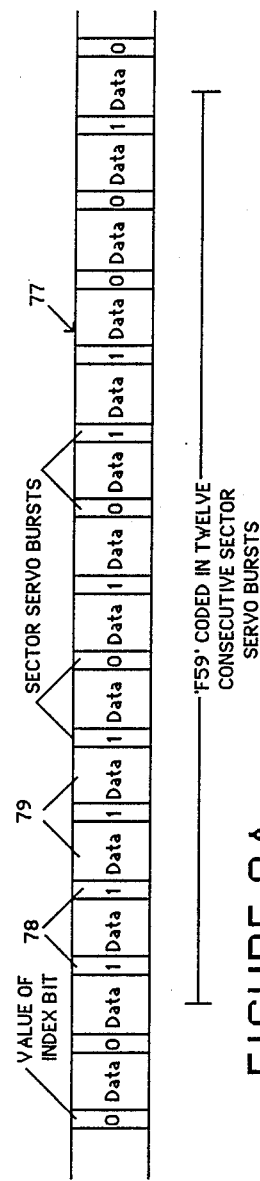
FIGS. 8A and 8B are diagrams of track encoding in a sector servo scheme.
Figure 8B:
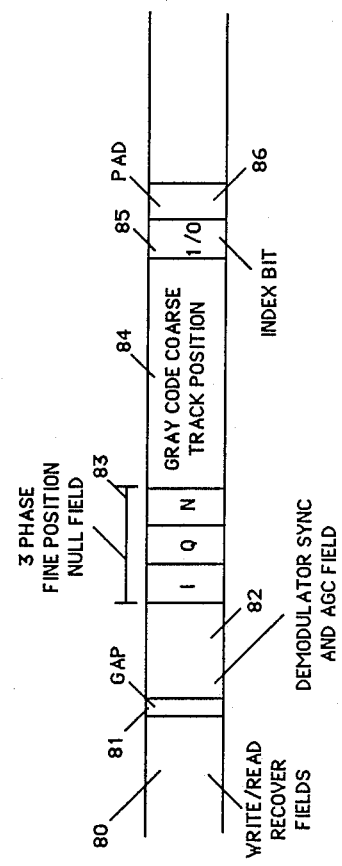

The tracks are encoded s shown in FIGS. 8A and 8B. A portion of a data track with sector servo bursts is illustrated in FIG. 8A.

Each sector servo burst is assigned a value of 1 or 0 according to the sense of the index bit, and a single instance of the highly self-correlated Hex F59 pattern is encoded at index points along the track by suitable interleaving of type 1 and type 0 servo bursts. Note that only a single Hex F59 sequence need by encoded because, unlike the dedicated servo embodiment, there is no need to avoid confusion with interleaved absolute position data. A track 77 includes data fields 79 interspersed with sector servo bursts 78. Fine position and gray code coarse track position information are encoded by means well known in the art. A special index bit is included within the servo sector burst. Typically a track can contain 100 sector bursts.

A sector servo burst is illustrated in FIG. 8B. Write-To-Read recovery fields 80 are followed by a gap 81 before demodulated sync field 82. The sync field is followed by a three-phase fine position null field 83 and a gray code coarse track position field 84. The index bit (which may be either 1 or 0) 85 follows the gray coarse track position field 84. The servo burst ends with Pad area 86.

Figure 9:
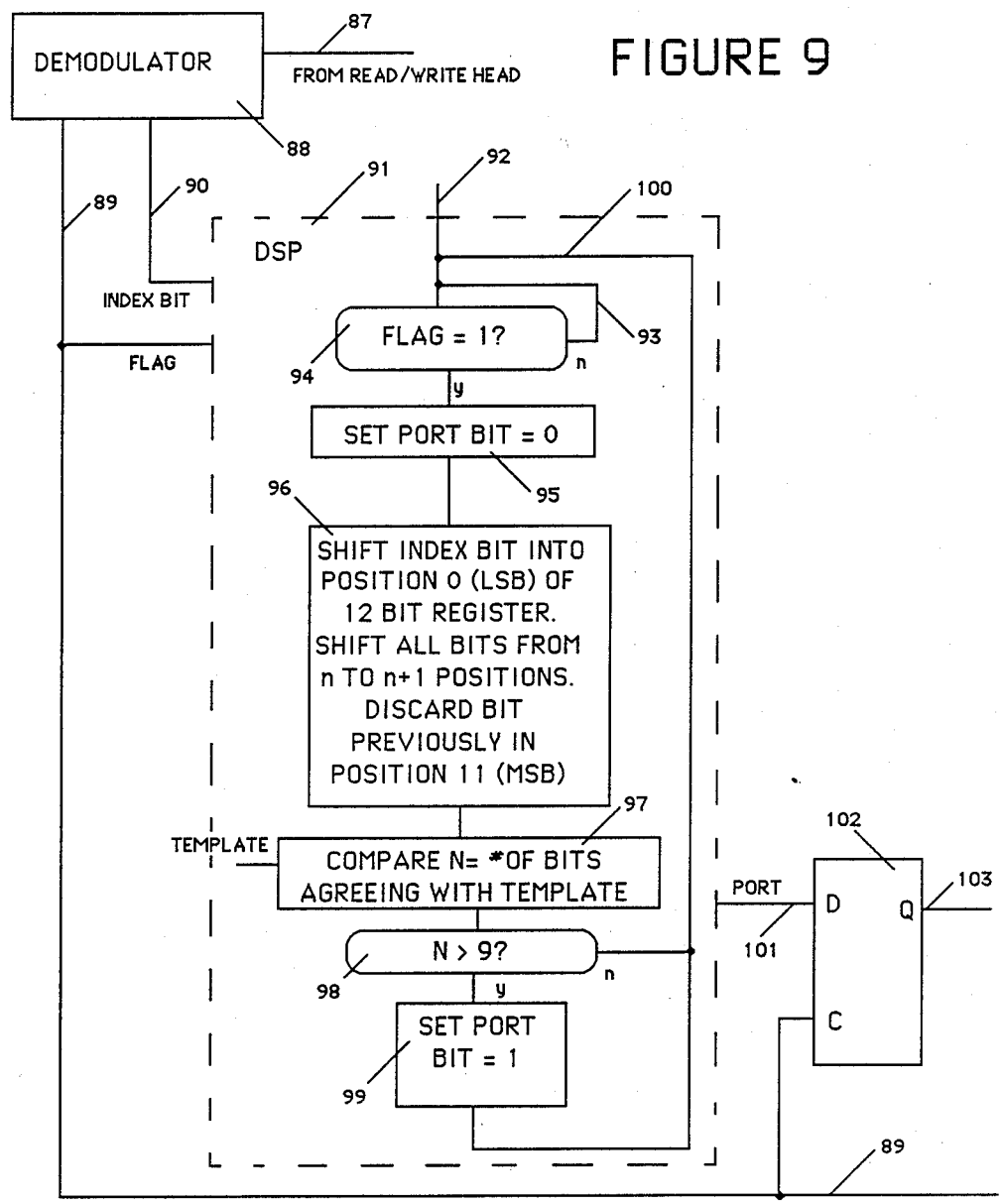
FIG. 9 is a flow chart illustrating decoding of an index bit in a sector servo scheme.

FIG. 9 illustrates decoding of index in a sector servo environment, in which a high-speed digital signal processor (DSP) 91 is employed to perform all servo compensation and control functions. Use of the DSP 91 allows hardware savings to be achieved relative to the dedicated servo case, since index decoding can be done in microcode in gaps between servo bursts. A fully general decoding scheme which permits decoding in the presence of three or fewer bits in errors can be realized without hardware penalty.

As each servo sector burst 87 arrives for the read/write head, it is demodulated at demodulator 88. Microcode shifts the associated index bit 90 into a 12-bit working register, which functions as a software shift register. After each new bit is shifted in, microcode determines the number of bit positions in agreement with an Hex F59 template held in software. If a count of agreeing bits equals or exceeds nine, an index has been detected.

As a consequence of index detection, software assets an I/O port bit 101 on the DSP is asserted for one sector interval. A flip-flop 102 synchronizing circuit accurately synchronizes the port 101 bit to the next servo sector. The output 103 of the synchronizing flip-flop 102 is provided as an index mark to the user system. Resynchronization is necessary to give a stable index because varying microcode program flow will result in time jitter of assertion of the DSP port bit.

The sector servo burst 87 from a read/write head is coupled to demodulator 88. Demodulator 88 outputs a clock signal 89 and an index bit signal 90. The clock 89 is clocked at the sector rate and so acts as a sector pulse. The index bit 90 is coupled to a digital signal processor 91 which executes a servo control program which is partially shown at 92. At step 94 of this program, the DSP 91 checks to see if a flag bit is equal to 1. If the flag bit is equal to 1, the DSP proceeds to step 95. If the flag is not equal to 1, the DSP 91 continues checking the flag until it is equal to 1, as shown by feedback loop 93.

At step 95, the port bit 101 is set equal to zero. At step 96, the index bit 90 is shifted into position zero (the least significant bit position) of a 12 bit software shift register. All of the other bits are shifted one position and the bit which was previously in position 11, most significant bit, is discarded. At step 97, the bits are compared with the template to determine the number of bits agreeing with the template. At step 98, the number of bits is tested to see if it is greater than 9 (the threshold detection value). If detection is not indicated, the DSP 91 repeats the process as shown by feedback loop 100. If the threshold is detected, the port bit is set equal to 1 at stage 99. The port bit 101 is coupled to flip-flop 102 along with the sector pulse signal 89. The output 103 at flip-flop 102 is an index pulse.

Thus, an improved method and apparatus for detecting an index pattern has been described.

I claim:

1. A servo pattern for defining an index of a data storage system comprising:
   a first bit sequence comprising a first number of bits formed on a surface of a storage media;
   a second bit sequence comprising a second number of bits formed adjacent said first bit sequence;
   a third bit sequence formed on said surface adjacent said second bit sequence such that said second bit sequence is disposed between said first and third bit sequence, said third bit sequence comprising the same bit sequence as said first bit sequence;
   said first bit sequence is such that when a template of said first bit sequence is sequentially compared to said first bit sequence, the number of agreeing bits between said template and said first bit sequence is minimized other than when said template is coincident with said first bit sequence.

2. The pattern of claim 1 wherein said first number of bits is 12.

3. The pattern of claim 2 wherein the maximum number of agreeing bits between said template and said first bit sequence is five other than when said template is coincident with said first bit sequence.

4. The pattern of claim 2 wherein said first bit sequence comprises 111101011001.

5. The pattern of claim 1 wherein said second number of bits is 3.

6. The pattern of claim 1 wherein said second bit sequence is a constant value bit sequence.

7. The pattern of claim 1 further including apparatus for detecting said pattern, said apparatus comprising:
   detection means disposed adjacent said surface for detecting said first, second and third bit sequences;
   shift register means coupled to said detection means for receiving said first, second and third bit sequences, said shift register providing a plurality of first outputs equal to said first number of bits;
   a plurality of first comparing means each coupled to one of said plurality of first outputs of said shift register means and to one bit of said template for comparing said first outputs to said template, said plurality of first comparing means providing a plurality of second outputs;

a counting means coupled to said plurality of second outputs for counting the number of outputs indicating agreeing bits between said template and said first outputs, said counting means providing a third output;

second comparing means coupled to said third ouptut and to a first reference value, said second comparing means providing an index detect output when said number of agreeing bit is greater than or equal to said reference value.

8. The pattern of claim 7 wherein said reference value comprises 9.

9. A positioning apparatus comprising:
a rotating disk comprising first and second surfaces;
a first bit sequence formed on said first surface, said first bit sequence comprising a first number of bits;
a second bit sequence comprising a second number of bits formed adjacent said first bit sequence;
a third bit sequence formed on said first surface adjacent said second bit sequence such that said second bit sequence is disposed between said first and third bit sequence, said third bit sequence comprising the same bit sequence as said first bit sequence;
detection means disposed adjacent said surface for detecting said first, second and third bit sequences;
shift register means coupled to said detection means for sequentially receiving said first, second and third bit sequences, said shift register means providing a plurality of first outputs equal to said first number of bits;
a plurality of first comparing means each coupled to one of said plurality of first outputs of said shift register means and to one bit of said template for comparing said first outputs to said template, said plurality of first comparing means providing a plurality of second outputs;
a counting means coupled to said plurality of second outputs for counting the number of outputs indicating agreeing bits between said template and said first outputs, said counting means providing a third output;
second comparing means coupled to said third output and to a first reference value, said second comparing means providing an index detect output when said number of agreeing bits is greater than or equal to said reference value, said first bit sequence such that said number of agreeing bits occurs only when said template is coincident with said first bit sequence and with said third bit sequence.

10. The apparatus of claim 9 wherein said shift register means comprises a serial input parallel output shift register.

11. The apparatus of claim 9 wherein said first number of bits comprises 12.

12. The apparatus of claim 11 wherein said first bit sequence comprises 111101011001.

13. The apparatus of claim 12 wherein the maximum number of agreeing bits between said template and said first bit sequence is five other than when said template is coincident with said first bit sequence.

14. The apparatus of claim 9 wherein said first bit sequence is such that when a template of said first bit sequence is sequentially compared to said first bit sequence, the number of agreeing bits between said template and said first bit sequence is minimized other than when said template is coincident with said first bit sequence.

15. The apparatus of claim 9 wherein said second number of bits is 3.

16. The apparatus of claim 15 wherein said second bit sequence is a constant value bit sequence.

17. The apparatus of claim 9 wherein said reference value comprises 9.

18. A method of detecting an index on a surface of a storage media comprising the steps of:
providing and index pattern on said surface, said index pattern comprising first second and third bit sequences, said first bit sequence comprising a first number of bits on said surface, said second bit sequence comprising a second number of bits of said surface adjacent said first bit sequence; repeating said first bit sequence as a third bit sequence formed on said surface that said second bit sequence is disposed between said first and third bit sequences;
sequentially reading said index pattern to provide a first, serial output signal;
comparing said first output signal with a template having a bit pattern equal to said first bit sequence and providing a second output signal comprising the number of bits in agreement between said template and said first output signal;
comparing said second output signal with a reference value and providing a third output signal indicating detection of said first bit sequence when said output is greater than or equal to said reference value.

19. The method of claim 18 wherein said first number of bits is 12.

20. The method of claim 19 wherein the maximum number of agreeing bits between said template and said first bit sequence is five other than when said template is coincident with said first bit sequence.

21. The method of claim 20 wherein said first bit sequence comprises 111101011001.

22. The method of claim 18 wherein said second number of bits is 3.

23. The method of claim 18 wherein said second bit sequence is a constant value bit sequence.

24. A position indicating apparatus comprising:
a rotating storage disk having first and second surfaces;
an index pattern formed on said surface, said index pattern comprising first second and third bit sequences, said first bit sequence comprising a first number of bits on said surface, said second bit sequence comprising a second number of bits on said surface adjacent said first bit sequence; repeating said first bit sequence as a third bit sequence formed on said surface such that said second bit sequence is disposed between said first and third bit sequences;
detection means disposed adjacent said first surface for detecting said index pattern and providing a first, serial output signal;
shift register means coupled to said detection means for receiving said first output signal, said shift register means providing a second, parallel output signal comprising said first number of bits;
a plurality of first comparing means each coupled to said second output signal and to one of a plurality of templates representing said first bit sequence having a burst error of a third number of bits, said first comparing means outputting a plurality of third output signals;

first logic means coupled to said first comparing means, said first logic means providing a fourth output signal when one of said third output signals indicate agreement between at least one of said templates and said second output signal, said fourth output signal representing detection of said first bit sequence.

25. The apparatus of claim 24 wherein said shift register means comprising a serial input parallel output shift register.

26. The apparatus of claim 24 wherein said first number of btis comprises 12.

27. The apparatus of claim 26 wherein said first bit sequence comprises 111101011001.

28. The apparatus of claim 24 wherein said first bit sequence is such that when a template of said first bit sequence is sequentially compared to said first bit sequence, the number of agreeing bits between said plurality of templates and said first bit sequence is minimized other than when said templates are coincident with said first bit sequence.

29. The apparatus of claim 24 wherein said second bit sequence is a constant value bit sequence.

* * * * *